(12) United States Patent  
Kullman et al.

(10) Patent No.: US 9,094,814 B1  
(45) Date of Patent: Jul. 28, 2015

(54) PROVISION OF RELAY OPERATION INFORMATION TO A WIRELESS COMMUNICATION NETWORK

(71) Applicant: Sprint Communications Company L.P., Overland Park, KS (US)

(72) Inventors: Nicholas David Kullman, Kansas City, MO (US); Sreekar Marupaduga, Overland Park, KS (US); Andrew Mark Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 255 days.

(21) Appl. No.: 13/804,182

(22) Filed: Mar. 14, 2013

(51) Int. Cl.
*H04B 7/14* (2006.01)
*H04W 8/22* (2009.01)
*H04W 72/06* (2009.01)
*H04B 7/155* (2006.01)

(52) U.S. Cl.
CPC ............... *H04W 8/22* (2013.01); *H04B 7/1555* (2013.01); *H04B 7/15542* (2013.01); *H04W 72/06* (2013.01)

(58) Field of Classification Search
CPC .......... H04B 7/15542; H04B 7/15555; H04W 72/06

USPC ......... 370/315, 329; 455/7, 434, 435.1, 452.1
See application file for complete search history.

(56) References Cited

U.S. PATENT DOCUMENTS

| | | | |
|---|---|---|---|
| 2005/0064879 A1* | 3/2005 | McAvoy | 455/456.1 |
| 2009/0262695 A1* | 10/2009 | Chen et al. | 370/329 |
| 2011/0044233 A1 | 2/2011 | Cho et al. | |
| 2011/0268014 A1 | 11/2011 | Mildh et al. | |
| 2011/0269394 A1 | 11/2011 | Mildh et al. | |
| 2012/0008550 A1 | 1/2012 | Chen et al. | |
| 2012/0120868 A1 | 5/2012 | Park et al. | |
| 2012/0184204 A1* | 7/2012 | Kazmi et al. | 455/7 |
| 2012/0196528 A1* | 8/2012 | Kazmi et al. | 455/9 |
| 2012/0218964 A1* | 8/2012 | Park et al. | 370/329 |
| 2012/0252447 A1* | 10/2012 | Sartori et al. | 455/434 |
| 2013/0109400 A1* | 5/2013 | Liu et al. | 455/452.1 |

* cited by examiner

*Primary Examiner* — Barry Taylor

(57) ABSTRACT

Embodiments disclosed herein provide systems and methods to provide relay operation information to a wireless communication network. In a particular embodiment, a method provides determining information regarding operation of a wireless communication relay and transferring the information to a Long Term Evolution (LTE) wireless communication network. The method further provides, based on the information, adjusting parameters for LTE communication paths that pass through the wireless communication relay.

8 Claims, 7 Drawing Sheets

PROVISION OF RELAY OPERATION INFORMATION TO A WIRELESS COMMUNICATION NETWORK

TECHNICAL BACKGROUND

In order to expand or enhance the wireless signal coverage of a wireless communication network, wireless communication relays may be added to locations not adequately covered by current network infrastructure. A relay repeats wireless signals exchanged between wireless devices and a wireless network access point and, therefore, does not require a backhaul connection to the wireless network's infrastructure. Without the signal repetition provided by the wireless relay, the coverage area of the wireless network access point may otherwise have not extended far enough to serve the wireless devices using the relay. Thus, a wireless relay provides a less resource intensive means for increasing wireless network coverage.

However, since a wireless relay acts as a transparent middleman system between a wireless network access point and wireless devices, neither the network access point nor any of the wireless devices are aware that their communications are being exchanged through the relay. This transparency means that any effect the relay has on the communication paths between the wireless devices and the network access point is not accounted for in the communications transferred on those paths. For example, the relay functionality may cause a time delay in communications on a communication path that would not be recognized as such by either end point on the communication path.

OVERVIEW

Embodiments disclosed herein provide systems and methods to provide relay operation information to a wireless communication network. In a particular embodiment, a method provides determining information regarding operation of a wireless communication relay and transferring the information to a Long Term Evolution (LTE) wireless communication network. The method further provides, based on the information, adjusting parameters for LTE communication paths that pass through the wireless communication relay.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
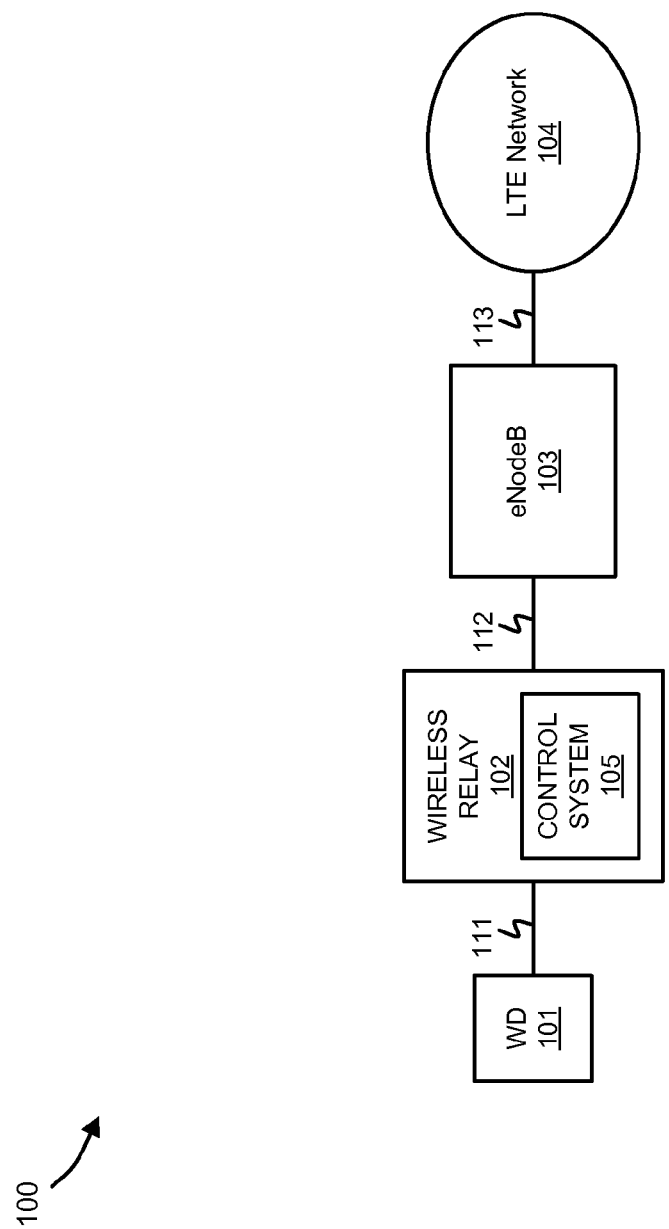
FIG. 1 illustrates a wireless communication system to provide relay operation information to a wireless communication network.

FIG. 1 illustrates wireless communication system 100. Wireless communication system 100 includes wireless communication device 101, wireless communication relay 102, eNodeB 103, Long Term Evolution (LTE) communication network 104, and communication control system 105. Wireless communication device 101 and wireless communication relay 102 communicate over wireless link 111. Wireless communication relay 102 and eNodeB 103 communicate over wireless link 112. eNodeB 103 and LTE communication network 104 communicate over communication link 113.

In operation, LTE network 104 includes eNodeB 103 to provide wireless network access to wireless communication devices, such as wireless device 101. eNodeBs exchange communications with LTE network 104 over backhaul links like communication link 113. Consequently, such a backhaul link is needed to expand and/or enhance network coverage by adding an additional eNodeB to LTE network 104 or relocating an existing eNodeB. Thus, to expand and/or enhance LTE network 104 without adding a new eNodeB, wireless relays/repeaters, such as wireless relay 102, can be used to extend the wireless coverage of an eNodeB. Wireless relay 102 serves to repeat the wireless signals from eNodeB 103 to wireless devices and to repeat the wireless signals from those wireless devices to eNodeB 103. As such, wireless relay 102 does not require a backhaul link to LTE network 104 and is therefore typically a less expensive and less complex system to deploy in place of an eNodeB.

However, the addition of another system in the wireless communication path between a wireless device and eNodeB 103 can effect the communications exchanged on that path. For example, the antenna configuration(s) of relay 102 may be different than those allowed by eNodeB 103 and/or wireless device 101, passing through relay 102 may delay communications exchanged between wireless device 101 and eNodeB 103, or any other issue that may be caused by adding an intermediate system on a wireless communication path—including combinations thereof. These issues typically go unnoticed or, if they are noticed, neither wireless device 101 nor eNodeB 103 recognizes that relay 102 is at fault, since a relay is supposed to operate transparently to other systems and devices.

Figure 2:
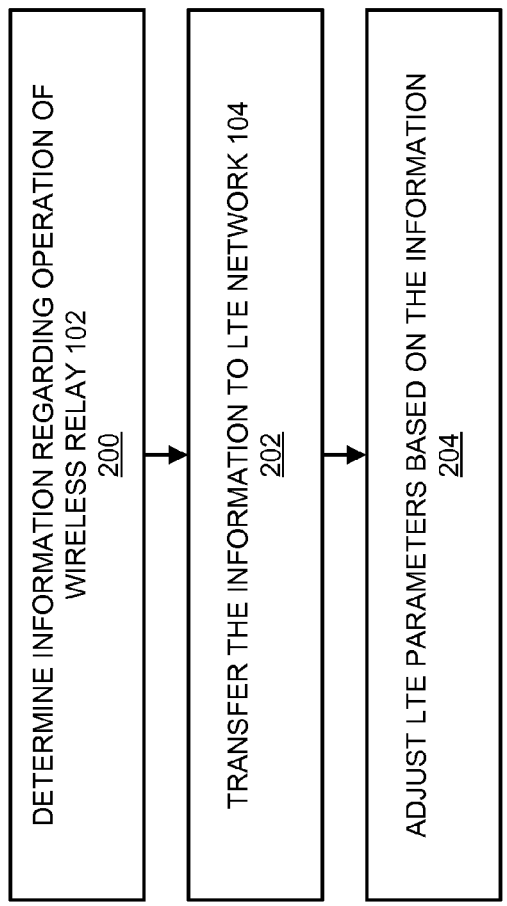
FIG. 2 illustrates an operation of the wireless communication system to provide relay operation information to a wireless communication network.

FIG. 2 illustrates an operation of wireless communication system 100 to provide relay operation information to a wireless communication network. Control system 105 determines information regarding operation of wireless relay 102 (step 200). The information may include a number of transmit and receive paths for wireless relay 102, a location of wireless relay 102, an antenna azimuth for wireless relay 102, an Effective Isotropically Radiated Power (EIRP) for wireless relay 102, identities of wireless devices communicating through wireless relay 102, a time delay for wireless communications transferred through wireless relay 102, or any other type of information regarding wireless relay 102—including combinations thereof.

In some embodiments, at least a portion of the information may be retrieved from embedded system information stored in a memory of wireless relay 102. For example, information such as the number of transmit and receive paths, the EIRP, and the coverage area for wireless relay 102 may be determined by the design and/or location placement of wireless relay 102. Therefore, such information may be written to the embedded system information when upon assembly of wireless relay 102 and/or upon installing wireless relay 102 at its location in wireless communication system 100. Other information, such as the identities of wireless devices communicating with eNodeB 103 through wireless relay 102, may be obtained during the operation of wireless relay 102. For example, to identify wireless device 101 having their communications relayed through relay 102, control system 105 may obtain device identifiers from the communications relayed transferred from wireless devices through wireless relay 102.

Control system 105 transfers the information to LTE network 104 (step 202). In some embodiments, the information may be transferred over an LTE wireless communication link similar to an LTE wireless communication link used by wireless devices to exchange communications with eNodeB 103. Accordingly, wireless relay 102 may be equipped with an LTE wireless modem that is able to register and exchange wireless communications with eNodeB 103 in much the same manner that wireless device 101 exchanges communications with eNodeB 103.

In alternative embodiments, control system 105 transfers the information by inserting the information into communications destined for eNodeB 103 from one or more wireless devices. Upon receipt of the communications, eNodeB 103, or some other system on LTE network 104, retrieves the information from the communications. For example, the information may be inserted into a reserved packet space within data packets transferred from wireless device 101. eNodeB 103 is then configured to retrieve the information inserted into the reserved packets from wireless device 101.

Upon receiving the information from wireless relay 102, eNodeB 103, or some other system within LTE network 104, adjusts parameters for LTE communication paths that pass through wireless relay 102 based on the information (step 204). The parameters may effect communication paths that currently pass through wireless relay 102, communication paths that will be established through wireless relay 102 going forward in time, or both. The parameters may apply to the operation of wireless devices communicating through wireless relay 102, eNodeB 103, or some other system on LTE network 104—including combinations thereof. The parameters may include a modulation coding scheme for communications on the communication paths, a rank index for wireless devices on the communication paths, a wireless coverage area for wireless relay 102, which may be based on an antenna azimuth of relay 102 and/or an Effective Isotropically Radiated Power (EIRP) of relay 102, a compensation for a time delay on the communication paths, such as increasing the cyclic prefix for the communications, or any other type of parameter that may effect how wireless devices, such as wireless device 101, eNodeB 103, or LTE network 104 exchange communications on the communication paths through relay 102.

After adjusting the parameters, communications are exchanged on communication paths that through wireless relay 102 in accordance with the parameters. If any of the information regarding the operation of relay 102 changes over time, wireless relay 102 may periodically, or upon detecting such a change, transfer the updated information so that the parameters can be adjusted accordingly. Therefore, even though wireless relay 102 performs transparently to wireless devices and eNodeB 103, the information from relay 102 allows the communication paths to compensate for the presence of relay 102.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless communication relay 102 comprises RF communication circuitry and an antenna. The RF communication circuitry typically includes an amplifier, filter, RF modulator, and signal processing circuitry. Wireless communications relay 102 may also comprise a memory device, software, processing circuitry, cabling, power supply, network communication interface, structural support, or some other communication apparatus.

eNodeB 103 comprises RF communication circuitry and an antenna. The RF communication circuitry typically includes an amplifier, filter, RF modulator, and signal processing circuitry. eNodeB 103 may also comprise a router, server, memory device, software, processing circuitry, cabling, power supply, network communication interface, structural support, or some other communication apparatus.

Communication control system 105 comprises a computer system and communication interface. Communication control system 105 may also include other components such a router, server, data storage system, and power supply. While communication control system 105 is illustrated as incorporated into relay 102, control system 105 may reside in a separate single device or may be distributed across multiple devices.

LTE communication network 105 comprises network elements that provide communications services to wireless device 101 through eNodeB 103. LTE network 105 may comprise switches, wireless access nodes, Internet routers, network gateways, application servers, computer systems, communication links, or some other type of communication equipment—including combinations thereof.

Wireless links 111-112 use the air or space as the transport media. Wireless links 111-112 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 113 uses metal, glass, air, space, or some other material as the transport media. Communication link 113 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 113 could be direct links or may include intermediate networks, systems, or devices.

Figure 3:
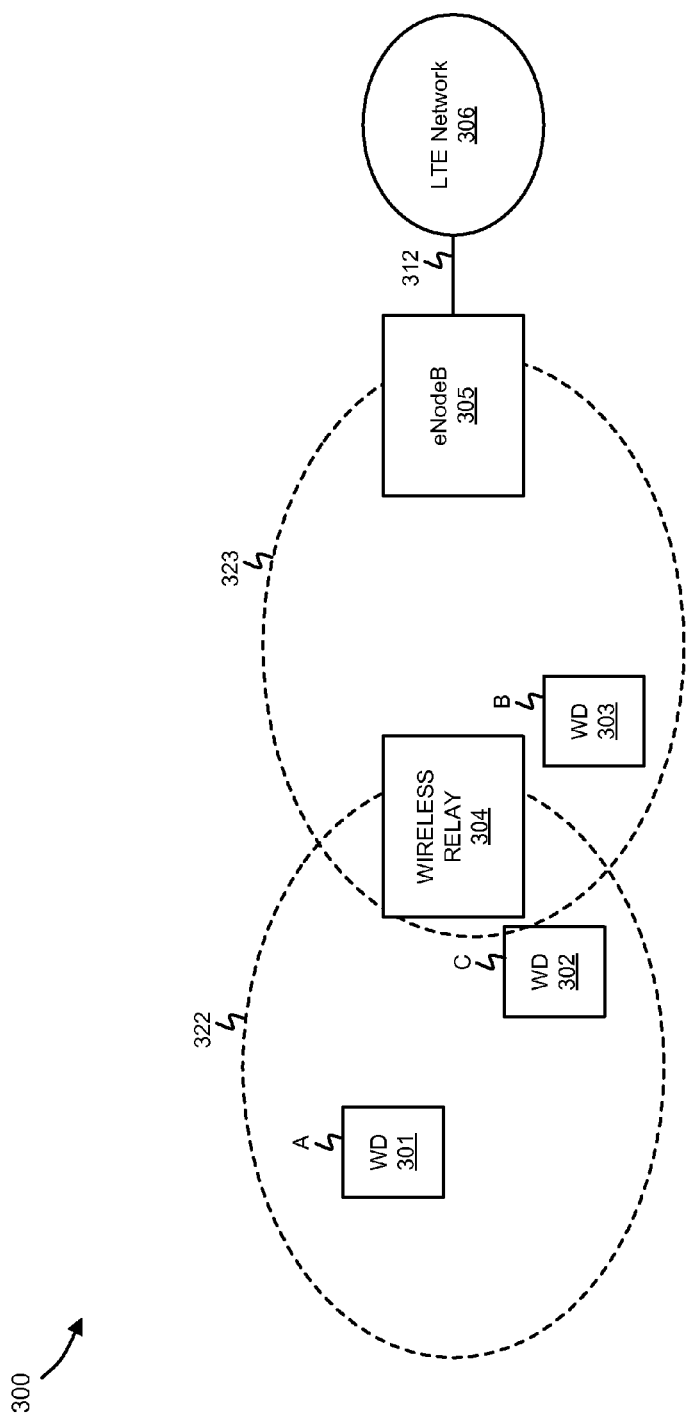
FIG. 3 illustrates a wireless communication system to provide relay operation information to a wireless communication network.

FIG. 3 illustrates wireless communication system 300. Wireless communication system 300 includes wireless communication devices 301-303, wireless communication relay 304, eNodeB 305, and LTE communication network 306. eNodeB 305 and LTE communication network 306 communicate over communication link 312. Wireless devices 301-303 wirelessly communicate with wireless relay 304 in coverage area 322. Wireless devices 301-303 wirelessly communicate with eNodeB 305 in coverage area 323. While wireless coverage areas 322 and 323 are shown as elliptical in shape, coverage areas 322 and 323 may take any other shape depending on wireless signal characteristics of wireless relay 304 and eNodeB 305, respectively. The functionality of control system 105 is incorporated into wireless relay 304 and, therefore, the combined system will simply be referred to as wireless relay 304 for clarity.

Figure 4:
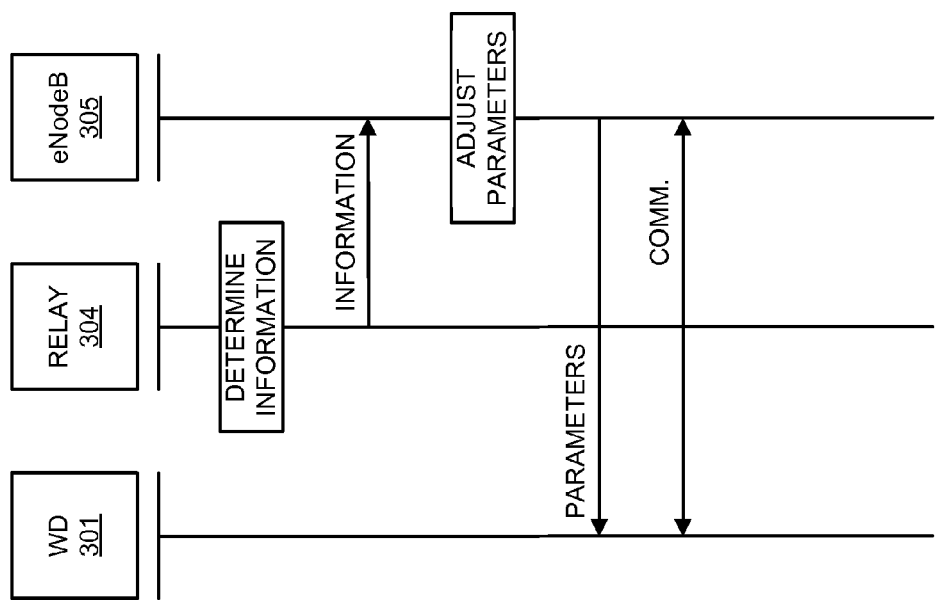
FIG. 4 illustrates an operation of the wireless communication system to provide relay operation information to a wireless communication network.

FIG. 4 is a sequence diagram illustrating an operation of wireless communication system 300 to provide relay operation information to a wireless communication network. In this embodiment, the sequence may begin upon relay 304 being activated to relay wireless communications or relay 304 may already be relaying wireless communications. In either situation, wireless relay 304 determines information about operational characteristics of wireless relay 304. The information may be information regarding the capabilities of relay 304, such as antenna azimuth, EIRP, supported frequencies, supported protocols, number of transmit and receive paths (e.g. antenna configuration), signal time delay, etc., or information regarding current operating conditions, such as a location of wireless relay 304, a number of communication paths being relayed, identifiers for those paths, identifiers for wireless devices on those paths, etc.

The determined information is then sent to eNodeB 305 so that eNodeB 305 can adjust parameters for LTE communication paths that pass through wireless relay 304. The information is sent using an LTE communication modem in wireless relay 304 communicating with eNodeB 305 over an LTE communication link. eNodeB 305 determines which LTE communication paths are passing through relay 304 based on the information. For example, as part of transferring the information, relay 304 may insert an indicator, such as the information itself or a flag, into packet communications on each communication path destined for eNodeB 305. eNodeB 305 will therefore know that paths that include the indicator are relayed paths while paths without the indicator are not. In another example, eNodeB 305 receives identifiers in the information for wireless devices operating on the communication paths and determines the communication paths for devices having those identifiers. In an alternative example, eNodeB 305 determines coverage area 322 of wireless relay 304 from the location, the antenna azimuth, and the EIRP of relay 304 indicated in the information. The location indicates where coverage area 322 originates, the azimuth indicates the direction and basic shape that the coverage area will take from the location, and the EIRP indicates how far coverage area 322 will reach. Once coverage area 322 is determined eNodeB 305 can then determine a location for all wireless devices communicating with eNodeB 305 and identify the relayed communication paths as the paths for wireless devices located in coverage area 322.

After determining the LTE communication paths passing through relay 304, eNodeB 305 adjusts parameters for the LTE communications being exchanged on those paths. The parameters may be parameters within eNodeB 305, within the wireless devices on the communication paths, or on some other system that may effect communications on the communication paths. If any of the parameters effect how a wireless device on one of the communication paths configures itself, then eNodeB 305 transfers those parameters to the applicable wireless devices. Likewise, any parameters that apply to other systems may be transferred to those systems as well.

In this example, the communication paths going through relay 304 are determined to be communication paths for wireless devices 301 and 302 because devices 301 and 302 are within coverage area 322, although only wireless device 301 is depicted in FIG. 4 for clarity. The parameters transferred to wireless device 301 and 302 may include a rank index (or other parameter related to the transmit/receive paths for a wireless device) for each wireless device so that each wireless device can configure its antenna configuration corresponding with the number of transmit and receive paths of relay 304. Additionally, the wireless device parameters may include an instruction for wireless devices 301 and 302 to increase a cyclic prefix for packet communications transferred on their respective communication paths to account for a delay caused by wireless relay 304. eNodeB 305 may also have a similar parameter to increase the cyclic prefix for communications transferred on the paths to wireless devices 301 and 302. In accordance with the parameters, communications are then exchanged on the communication paths between the wireless devices 301, 302, and eNodeB 305 to compensate for the presence of wireless relay 304 on the paths.

Figure 5:
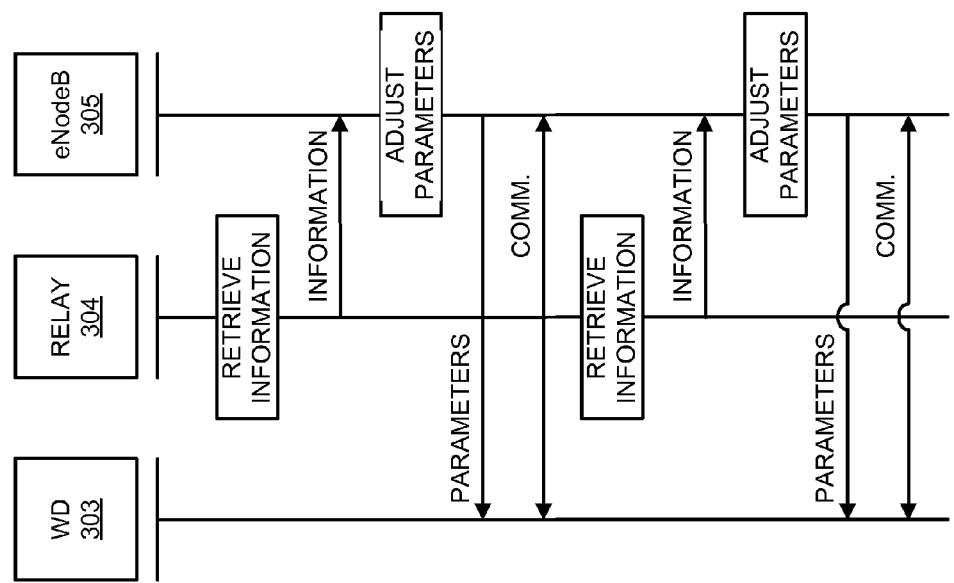
FIG. 5 illustrates an operation of the wireless communication system to provide relay operation information to a wireless communication network.

FIG. 5 is a sequence diagram illustrating an operation of wireless communication system 300 to provide relay operation information to a wireless communication network. In this embodiment, eNodeB 305 receives information and adjusts parameters in a manner similar to that described above with respect to FIG. 4. While relay 305 is relaying communications for wireless devices, wireless relay 304 determines further information. The further information includes information that may change over time, such as the number of communication paths being relayed and the identifiers of the wireless devices on the relayed communication paths. Wireless relay 304 then transfers this further information to eNodeB 305. While the invariable information, such as the location, EIRP, and antenna azimuth of relay 304, has already been transferred to eNodeB 305, wireless relay 304 may or may not retransfer the invariable information.

After receiving the further information, eNodeB 305 then adjusts parameters on the communication paths based on this further information. eNodeB 305 uses the further information to determine which communication paths are passing through wireless relay 304. In this embodiment, the further information indicate that wireless device 303, which was communicating through relay 304 along with devices 301 and 302, is no longer communicating through relay 304 because wireless device 303 is no longer within coverage area 322. eNodeB 305 may recognize this fact because the further information no longer includes an identifier for wireless device 303 as being a wireless device on one of the LTE communication paths. Therefore, eNodeB 305 adjusts the parameters for the path between wireless device 303 and eNodeB 305 to reflect the fact that compensation for relay 304 is no longer needed.

Wireless relay 304 repeats the steps of determining further information and transferring the further information to eNodeB 305 periodically or whenever the information changes so that eNodeB 305 can keep the parameters adjusted to current conditions.

Figure 6:
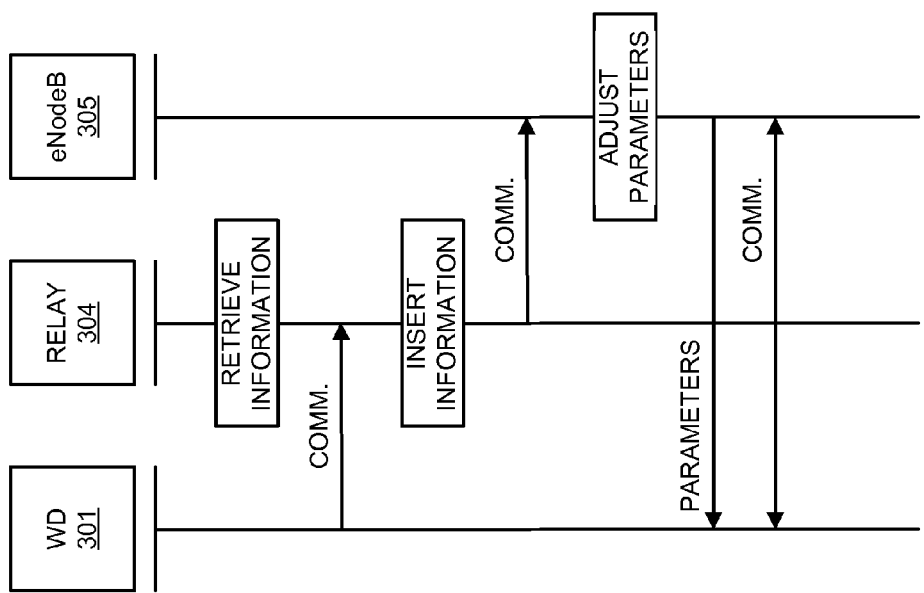
FIG. 6 illustrates an operation of the wireless communication system to provide relay operation information to a wireless communication network.

FIG. 6 is a sequence diagram illustrating an operation of wireless communication system 300 to provide relay operation information to a wireless communication network. This embodiment proceeds in the same way as described above regarding FIG. 4. However, the relay information is transferred to eNodeB 305 by inserting the information into reserved packet space in LTE communications from wireless devices on the communication paths being relayed. eNodeB 305 is therefore configured to retrieve relay information from the reserved packet space. The information may be transferred on a single communication path, such as the path with wireless device 301 as illustrated in FIG. 6, or may be included on all paths relayed through relay 304. Including the information on all paths may also indicate which communication paths are relayed through relay 304 because eNodeB 305 is able to recognize that any communication paths that include information are communication paths that pass through wireless relay 305.

Figure 7:
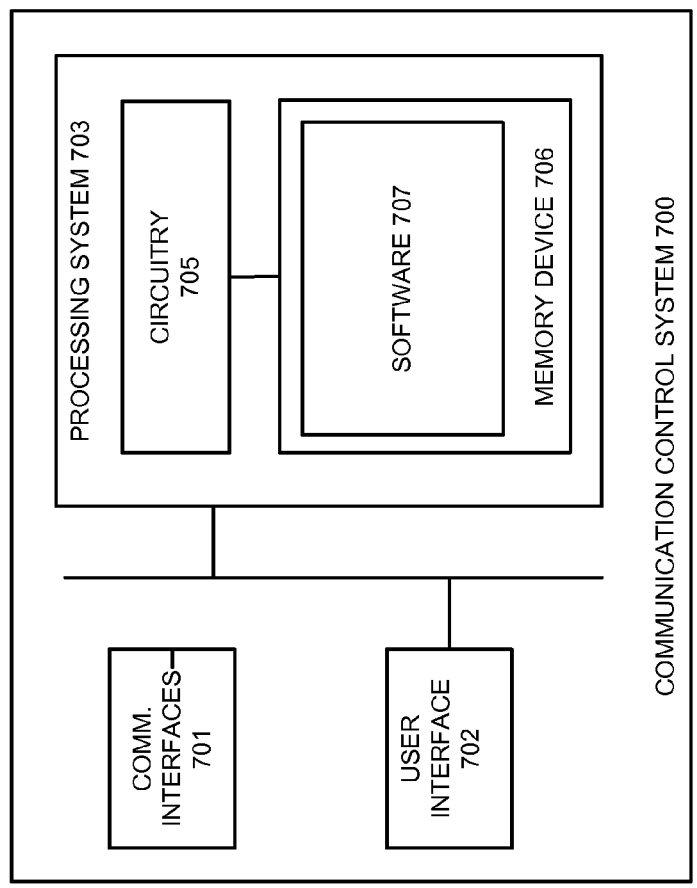
FIG. 7 illustrates a communication control system to provide relay operation information to a wireless communication network.

FIG. 7 illustrates communication control system 700. Communication control system 700 is an example of communication control system 105, although control system 105 may use alternative configurations. Communication control system 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 may include an operating system, utilities, drivers, network interfaces, applications, or some other type of software. When executed by circuitry 705, operating software 707 directs processing system 703 to operate communication control system 700 as described herein.

In particular, operating software 707 directs processing system 703 to determine information regarding operation of a wireless communication relay. Operating software further directs processing system 703 to transfer the information to a Long Term Evolution (LTE) wireless communication network. Based on the information, the LTE wireless communication network adjusts parameters for LTE communication paths that pass through the wireless communication relay.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Long Term Evolution (LTE) communication system, comprising:
    a wireless communication relay determining a number of transmit paths, a number of receive paths, and an azimuth of the wireless communication relay and-transferring the number of transmit paths, the number of receive paths, and the azimuth of the wireless communication relay to an LTE eNodeB;
    the LTE eNodeB selecting a modulation coding scheme and a rank index for LTE communication paths that pass through the wireless communication relay based on the number of transmit paths, the number of receive paths, and the azimuth of the wireless communication relay; and
    the LTE eNodeB exchanging communications on the LTE communication paths through the wireless communication relay using the selected modulation coding scheme and the rank index.

2. The method of claim 1, wherein transferring the number of transmit paths, the number of receive paths, and the azimuth of the wireless communication relay comprises transferring the number of transmit paths, the number of receive paths, and the azimuth of the wireless communication relay when the wireless communication relay registers with the LTE wireless communication network.

3. The method of claim 1 further comprising updating a coverage area for the wireless communication relay based on the azimuth.

4. The method of claim 1 further comprising:
    the wireless relay determining and transferring Effective Isotropically Radiated Power (EIRP) of the wireless communication relay to the LTE eNodeB; and
    the LTE eNodeB updating a coverage area for the wireless communication relay based on the EIRP.

5. A Long Term Evolution (LTE) communication system, comprising:
    a wireless communication relay configured to determine a number of transmit paths, a number of receive paths, and an azimuth of the wireless communication relay and transfer the number of transmit paths, the number of receive paths, and the azimuth of the wireless communication relay to an LTE eNodeB;
    the LTE eNodeB configured to select a modulation coding scheme and a rank index for LTE communication paths that pass through the wireless communication relay based on the number of transmit paths, the number of receive paths, and the azimuth of the wireless communication relay; and
    the LTE eNodeB configured to exchange communications on the LTE communication paths through the wireless communication relay using the selected modulation coding scheme and the rank index.

6. The method of claim 5, wherein the wireless communication relay configured to transfer the number of transmit paths, the number of receive paths, and the azimuth of the wireless communication relay comprises transferring the number of transmit paths, the number of receive paths, and the azimuth of the wireless communication relay when the wireless communication relay registers with the LTE wireless communication network.

7. The method of claim 5 further comprising the LTE eNodeB configured to update a coverage area for the wireless communication relay based on the azimuth.

8. The method of claim 5 further comprising:
the wireless communication relay configured to determine and transfer Effective Isotropically Radiated Power (EIRP) of the wireless communication relay to the LTE eNodeB; and
the LTE eNodeB configured to update a coverage area for the wireless communication relay based on the EIRP.

* * * * *